United States Patent
Wang

(10) Patent No.: US 11,314,979 B2
(45) Date of Patent: Apr. 26, 2022

(54) METHOD AND APPARATUS FOR EVALUATING IMAGE ACQUISITION ACCURACY, ELECTRONIC DEVICE AND STORAGE MEDIUM

(71) Applicants: CHENGDU BOE OPTOELECTRONICS TECHNOLOGY CO., LTD., Sichuan (CN); BOE TECHNOLOGY GROUP CO., LTD., Beijing (CN)

(72) Inventor: Bin Wang, Beijing (CN)

(73) Assignees: CHENGDU BOE OPTOELECTRONICS TECHNOLOGY CO., LTD., Sichuan (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 17/256,072

(22) PCT Filed: Jun. 19, 2020

(86) PCT No.: PCT/CN2020/097122
§ 371 (c)(1),
(2) Date: Dec. 24, 2020

(87) PCT Pub. No.: WO2020/253827
PCT Pub. Date: Dec. 24, 2020

(65) Prior Publication Data
US 2021/0150257 A1 May 20, 2021

(30) Foreign Application Priority Data
Jun. 21, 2019 (CN) .......................... 201910543098.8

(51) Int. Cl.
*G06K 9/03* (2006.01)
*G06K 9/20* (2006.01)
(Continued)

(52) U.S. Cl.
CPC ........... *G06K 9/036* (2013.01); *G06K 9/2054* (2013.01); *G06K 9/32* (2013.01); *G06K 9/623* (2013.01);
(Continued)

(58) Field of Classification Search
CPC ........ G06K 9/036; G06K 9/2054; G06K 9/32; G06K 9/6211; G06K 9/623; G06K 9/6262; G06K 2009/3291; G06T 7/80
See application file for complete search history.

(56) References Cited

U.S. PATENT DOCUMENTS

2012/0062609 A1    3/2012  Jeon
2020/0380897 A1*  12/2020  Feng ..................... G09G 3/006

FOREIGN PATENT DOCUMENTS

CN       103024426 A       4/2013
CN       105120258 A   *  12/2015
(Continued)

OTHER PUBLICATIONS

First Office Action dated Mar. 13, 2020 for corresponding Chinese application No. 201910543098.8.
(Continued)

*Primary Examiner* — Casey L Kretzer
(74) *Attorney, Agent, or Firm* — Nath, Goldberg & Meyer; Joshua B. Goldberg

(57) ABSTRACT

The present disclosure provides a method for evaluating an image acquisition accuracy of a Demura device, including: controlling a display panel to display a detection picture, wherein the detection picture includes a plurality of test point patterns with an interval therebetween; acquiring an image of the detection picture by the Demura device to obtain a preprocessed image corresponding to the detection picture, wherein the preprocessed image and a corresponding detection picture have a same size and a same shape; and
(Continued)

determining the image acquisition accuracy of the Demura device according to a difference between a position of each of the plurality of test point patterns in the detection picture and a corresponding position of the test point pattern in the preprocessed image. The present disclosure also provides an apparatus for evaluating an image acquisition accuracy of a Demura device, an electronic device and a non-transitory computer-readable storage medium.

20 Claims, 5 Drawing Sheets

(51) Int. Cl.
  *G06K 9/32* (2006.01)
  *G06K 9/62* (2006.01)
  *G06T 7/80* (2017.01)
(52) U.S. Cl.
  CPC .......... *G06K 9/6211* (2013.01); *G06K 9/6262* (2013.01); *G06T 7/80* (2017.01); *G06K 2009/3291* (2013.01)

(56) References Cited

FOREIGN PATENT DOCUMENTS

| | | | |
|---|---|---|---|
| CN | 105120258 | A | 12/2015 |
| CN | 105389809 | A | 3/2016 |
| CN | 107240384 | A | 10/2017 |
| CN | 107358935 | A | 11/2017 |
| CN | 108234998 | A | 6/2018 |
| CN | 108831358 | A | 11/2018 |
| CN | 108924544 | A | 11/2018 |
| CN | 109859155 | A | 6/2019 |
| CN | 110225336 | A | 9/2019 |

OTHER PUBLICATIONS

Second Office Action dated Aug. 10, 2020 for corresponding Chinese application No. 201910543098.8.
Decision of Rejection dated Mar. 1, 2021 for corresponding Chinese application No. 201910543098.8.

* cited by examiner

METHOD AND APPARATUS FOR EVALUATING IMAGE ACQUISITION ACCURACY, ELECTRONIC DEVICE AND STORAGE MEDIUM

CROSS-REFERENCE TO RELATED APPLICATIONS

This is a National Phase Application filed under 35 U.S.C. 371 as a national stage of PCT/CN2020/097122, filed Jun. 19, 2020, an application which claims priority to the Chinese Patent Application No. 201910543098.8, filed on Jun. 21, 2019, the content of each which is incorporated herein in its entirety by reference.

TECHNICAL FIELD

The present disclosure relates to a field of display technology, and in particular to a method and an apparatus for evaluating an image acquisition accuracy of a Demura device, an electronic device, and a non-transitory computer-readable storage medium.

BACKGROUND

A driving circuit of an Organic Light-Emitting Diode (OLED) display device may include a plurality of thin film transistors. Due to the limitation of a crystallization process, the thin film transistors at different positions often have non-uniformity in electrical parameters such as threshold voltage, mobility, etc., such that a display panel of the display device is easy to have a local ripple (which is often referred to as Mura) phenomenon. In order to improve the display effect, it is required to compensate the display panel to remove the local ripple phenomenon (i.e., to Demura).

SUMMARY

Embodiments of the present disclosure provide a method and an apparatus for evaluating an image acquisition accuracy of a Demura device, an electronic device, and a non-transitory computer-readable storage medium.

A first aspect of the present disclosure provides a method for evaluating an image acquisition accuracy of a Demura device, and the method includes:

controlling a display panel to display a detection picture, wherein the detection picture includes a plurality of test point patterns with an interval therebetween;

acquiring an image of the detection picture by the Demura device to obtain a preprocessed image corresponding to the detection picture, wherein the preprocessed image and a corresponding detection picture have a same size and a same shape; and determining the image acquisition accuracy of the Demura device according to a difference between a position of each test point pattern of the plurality of test point patterns in the detection picture and a corresponding position of the test point pattern in the preprocessed image.

In an embodiment, the determining the image acquisition accuracy of the Demura device according to a difference between a position of each test point pattern of the plurality of test point patterns in the detection picture and a corresponding position of the test point pattern in the preprocessed image includes:

performing low-pass filtering on the preprocessed image;

performing a binarization processing on a low-pass filtered image to obtain a binary image, wherein the binary image includes a plurality of test spots in one-to-one correspondence with the plurality of test point patterns; and determining the image acquisition accuracy of the Demura device according to a difference between the position of each of the plurality of test point patterns in the detection picture and a position of a corresponding test spot in the binary image.

In an embodiment, the determining the image acquisition accuracy of the Demura device according to a difference between the position of each of the plurality of test point patterns in the detection picture and a position of a corresponding test spot in the binary image includes:

acquiring a coordinate of a center of each test point pattern of the plurality of test point patterns in a preset coordinate system and a coordinate of a center of a test spot corresponding to the test point pattern in the preset coordinate system, wherein a coverage range of the detection picture in the preset coordinate system and a coverage range of the binary image in the preset coordinate system are identical with each other;

calculating an offset distance between each of the plurality of test point patterns and the corresponding test spot according to the coordinate of the center of each of the plurality of test point patterns and the coordinate of the center of the corresponding test spot;

forming an offset distance set according to the offset distance between each of the plurality of test point patterns and the corresponding test spot, and calculating an average value and a standard deviation of the offset distance set; and determining the image acquisition accuracy of the Demura device according to the average value and the standard deviation of the offset distance set.

In an embodiment, an offset distance D between each test point pattern of the plurality of test point patterns and the corresponding test spot is calculated according to the following formula:

$$D=\sqrt{(x^2+y^2)}$$

where x is a difference between an abscissa of the center of the test point pattern in the preset coordinate system and an abscissa of the center of the corresponding test spot in the preset coordinate system; and y is a difference between an ordinate of the center of the test point pattern in the preset coordinate system and an ordinate of the center of the corresponding test spot in the preset coordinate system.

In an embodiment, a grayscale of each of the plurality of test point patterns is between 95 and 255, and a grayscale of other positions except the plurality of test point patterns in the detection picture is between 0 and 50.

In an embodiment, each of the plurality of test point patterns is a single pixel.

In an embodiment, the plurality of test point patterns are uniformly arranged in an array.

In an embodiment, every two adjacent test point patterns of the plurality of test point patterns in the detection picture are arranged with a same interval therebetween.

In an embodiment, the grayscale of each of the plurality of test point patterns is 225, and the grayscale of the other positions except the plurality of test point patterns in the detection picture is 31.

A second aspect of the present disclosure provides an apparatus for evaluating an image acquisition accuracy of a Demura device, including:

a controller configured to control a display panel to display a detection picture, wherein the detection picture includes a plurality of test point patterns with an interval therebetween;

an acquisition assembly configured to acquire a preprocessed image corresponding to the detection picture, wherein the preprocessed image and a corresponding detection picture have a same size and a same shape; and a determination assembly configured to determine the image acquisition accuracy of the Demura device according to a difference between a position of each test point pattern of the plurality of test point patterns in the detection picture and a corresponding position of test point pattern in the preprocessed image.

In an embodiment, the determination assembly includes:

a filtering unit configured to perform low-pass filtering on the preprocessed image;

a binarization unit configured to perform a binarization processing on a low-pass filtered image to obtain a binary image, wherein the binary image includes a plurality of test spots in one-to-one correspondence with the plurality of test point patterns; and a determination unit configured to determine the image acquisition accuracy of the Demura device according to a difference between the position of each of the plurality of test point patterns in the detection picture and a position of a corresponding test spot in the binary image.

In an embodiment, the determination unit includes:

a coordinate acquisition subunit configured to acquire a coordinate of a center of each test point pattern of the plurality of test point patterns in a preset coordinate system and a coordinate of a center of the test spot corresponding to the test point pattern in the preset coordinate system, wherein a coverage range of the detection picture in the preset coordinate system and a coverage range of the binary image in the preset coordinate system are identical with each other;

a first calculation subunit configured to calculate an offset distance between each of the plurality of test point patterns and the corresponding test spot according to the coordinate of the center of each of the plurality of test point patterns and the coordinate of the center of the corresponding test spot;

a second calculation subunit configured to form an offset distance set according to the offset distance between each of the plurality of test point patterns and the corresponding test spot, and calculate an average value and a standard deviation of the offset distance set; and a determination subunit configured to determine the image acquisition accuracy of the Demura device according to the average value and the standard deviation of the offset distance set.

In an embodiment, the first calculation subunit is configured to calculate an offset distance D between each test point pattern of the plurality of test spot patterns and the corresponding test spot according to the following formula:

$$D=\sqrt{(x^2+y^2)}$$

where x is a difference between an abscissa of the center of the test point pattern in the preset coordinate system and an abscissa of the center of the corresponding test spot in the preset coordinate system; and y is a difference between an ordinate of the center of the test point pattern in the preset coordinate system and an ordinate of the center of the corresponding test spot in the preset coordinate system.

In an embodiment, a grayscale of each of the plurality of test point patterns is between 95 and 255, and a grayscale of other positions except the plurality of test point patterns in the detection picture is between 0 and 50.

In an embodiment, each of the plurality of test point patterns is a single pixel.

In an embodiment, the plurality of test point patterns are uniformly arranged in an array.

In an embodiment, every two adjacent test point patterns of the plurality of test point patterns in the detection picture are arranged with a same interval therebetween.

In an embodiment, the grayscale of each of the plurality of test point patterns is 225, and the grayscale of the other positions except the plurality of test point patterns in the detection picture is 31.

A third aspect of the present disclosure provides an electronic device, including: one or more processors;

a storage device having one or more programs stored thereon, which when executed by the one or more processors, cause the one or more processors to implement the method of any one of the embodiments of the first aspect of the present disclosure.

A fourth aspect of the present disclosure provides a non-transitory computer-readable storage medium, including a computer program stored thereon, wherein the computer program, when executed by a processor, implements the method of any one of the embodiments of the first aspect of the present disclosure.

BRIEF DESCRIPTION OF THE DRAWINGS

The accompanying drawings, which provide a further understanding of the present disclosure and are incorporated herein and constitute a part of the description, illustrate exemplary embodiments of the present disclosure and together with the description serve to explain the principles of the present disclosure, but not to limit the present disclosure. In the drawings.

DETAILED DESCRIPTION

Exemplary embodiments of the present disclosure will be described in detail below with reference to the accompanying drawings. It should be understood that the exemplary embodiments described herein are only for illustrating and explaining the present disclosure, and are not intended to limit the present disclosure.

The inventor of the present inventive concept has found that, when performing Demura compensation, a Demura device (which may be a camera for Demura) may acquire an image of a display picture displayed on a display panel, Demura compensation data may be calculated from the acquired image, and then Demura compensation may be performed on the display panel with the Demura compensation data. Therefore, an image acquisition accuracy of the Demura device has a direct influence on the effect of Demura compensation.

At present, a Demura compensation process includes a pre-processing and a compensation processing. For example, during the pre-processing, a Demura device is used for acquiring an image of a display picture displayed on a display panel. During the compensation processing, Demura compensation data is calculated according to the acquired image, and Demura compensation is performed on the display panel according to the Demura compensation data. During the pre-processing, image acquisition accuracies of Demura devices provided by different manufacturers are different, and at present, the image acquisition accuracies (i.e., the effects of pre-processing) are generally evaluated by the observation of human eyes. However, this method cannot accurately judge the quality of each of the effects of different pre-processings, and thus cannot accurately determine the Demura device with a good compensation effect, thereby affecting the Demura compensation effect.

Figure 1:
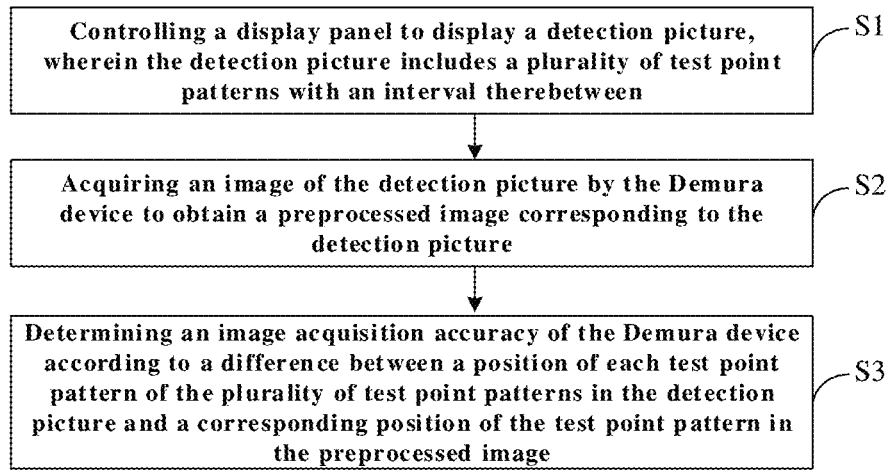
FIG. 1 is a schematic flowchart of a method for evaluating an image acquisition accuracy of a Demura device according to an embodiment of the present disclosure.

FIG. 1 shows a method for evaluating an image acquisition accuracy of a Demura device according to an embodiment of the present disclosure. As shown in FIG. 1, the method may include the following steps S1 to S3.

In step S1, a display panel is controlled to display a detection picture, and the detection picture includes a plurality of test point patterns with an interval therebetween. Alternatively, the intervals between every two adjacent test point patterns among the plurality of test point patterns in the detection picture may be equal to each other.

Figure 1A:
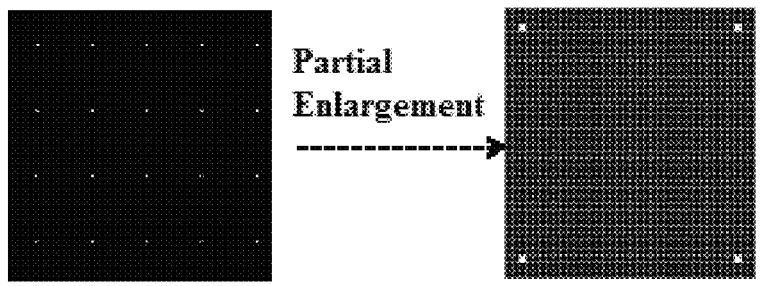
FIG. 1A is a schematic diagram illustrating a plurality of test point patterns in a detection picture according to an embodiment of the present disclosure.

For example, as shown in FIG. 1A, the detection picture includes a plurality of pixels, and a test point pattern may be a single pixel. The plurality of test point patterns may be uniformly arranged in an array.

In order to facilitate subsequent detection, the other positions of the detection picture except the test point patterns may be set with a solid color, e.g. black or dark gray. Moreover, the grayscale of the test point patterns and the grayscale of the other positions may have a large difference. For example, the grayscale of the test point patterns is 200 or more, and the grayscale of the other positions is 40 or less; alternatively, the grayscale of the test point patterns is 40 or less, and the grayscale of the other positions is 200 or more.

In step S2, an image of the detection picture is acquired by the Demura device to obtain a preprocessed image corresponding to the detection picture. The preprocessed image and the corresponding detection picture have a same size and a same shape.

Figure 1B:
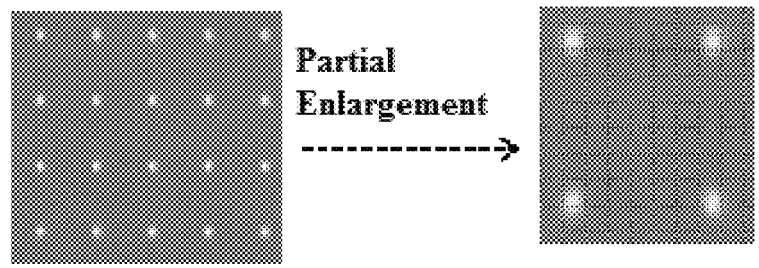
FIG. 1B is a schematic diagram illustrating a preprocessed image obtained by a Demura device after acquiring an image of the detection picture according to an embodiment of the present disclosure.

For example, FIG. 1B is a schematic diagram illustrating a preprocessed image obtained by a Demura device after acquiring an image of the detection picture according to an embodiment of the present disclosure. A commonly used Demura device may be a Demura camera or the like.

In step S3, the image acquisition accuracy of the Demura device is determined according to the difference between the position of each of the plurality of test point patterns in the detection picture and the corresponding position in the preprocessed image.

For example, the position of each test point pattern in the detection picture may be the position of a center of the test point pattern in the detection picture, and accordingly, the corresponding position of the test point pattern in the preprocessed image is the position of the center of the test point pattern in the preprocessed image.

The image acquisition accuracy of the Demura device has a negative correlation with the difference between the position of each test point pattern in the detection picture and the corresponding position of the test point pattern in the preprocessed image. The image acquisition accuracy of the Demura device is lower when the difference (e.g., distance) between the position of each of the plurality of test point patterns in the detection picture and the corresponding position of the test point pattern in the preprocessed image is larger. The image acquisition accuracy of the Demura device is higher when the difference (e.g., distance) between the position of each of the plurality of test point patterns in the detection picture and the corresponding position of the test point pattern in the preprocessed image is smaller.

In the present disclosure, the image acquisition accuracy of the Demura device is determined according to the difference between the position of each of the plurality of test point patterns in the detection picture and the corresponding position of the test point pattern in the preprocessed image, but does not depend on the judgment of human eyes. Thus, uncertain factors such as an environment factor, human subjective consciousness and the like are eliminated. Therefore, the image acquisition accuracy of the Demura device can be accurately evaluated. Thus, the Demura device with a higher image acquisition accuracy can be selected, and the effect of Demura compensation is improved.

During evaluation of the image acquisition accuracy of the Demura device, the display panel may be controlled to display a detection picture, based on which the image acquisition accuracy of the Demura device is determined through steps S2 and S3. Alternatively, the display panel may be controlled to display a plurality of detection pictures, for each of the plurality of detection pictures, one image acquisition accuracy is determined through the steps S2 and S3, and the lowest accuracy thereof is taken as the final image acquisition accuracy of the Demura device. For example, in the plurality of detection pictures, the grayscale of a test point in one detection picture is between 95 and 255, and the grayscale of other positions is 31; the grayscale of a test point in another detection picture is between 0 and 50, and the grayscale of other positions is 225.

Generally, when other positions except for each test point in the detection picture is dark, the image acquisition accuracy is low. Therefore, the display panel may be controlled to display a detection picture, and the grayscale of other positions except each test point in the detection picture is relatively low. In some embodiments of the present disclosure, the grayscale of each test point is between 95 and 255; the grayscale of other positions in the detection picture is between 0 and 50. For example, the grayscale of each test point is 225, and the grayscale of other positions in the detection picture is 31. In this way, the image acquisition accuracy is higher, such that more accurate evaluation can be performed.

Figure 2:
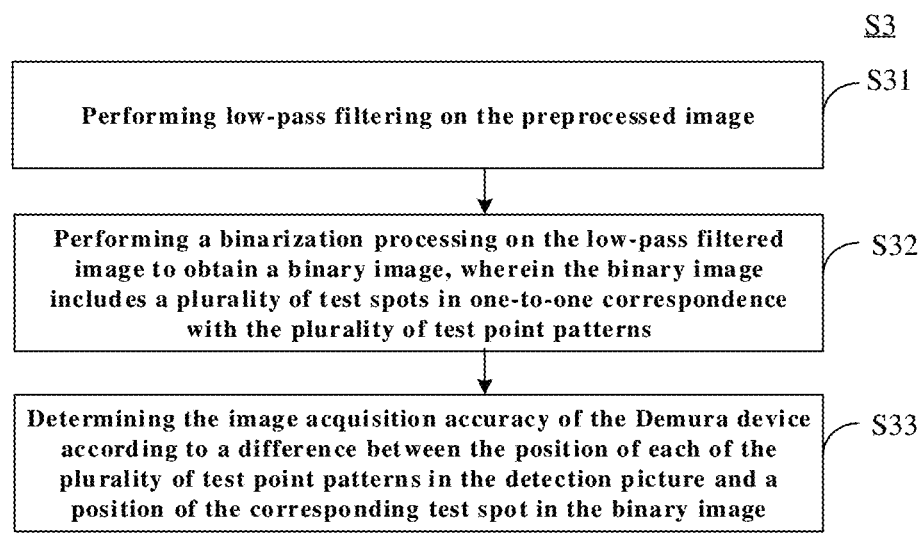
FIG. 2 is a schematic flowchart illustrating an alternative implementation of step S3 shown in FIG. 1.

FIG. 2 is a flowchart illustrating an alternative implementation of step S3 according to an embodiment of the present disclosure. As shown in FIG. 2, step S3 may include steps S31 to S33.

In step S31, low-pass filtering is performed on the pre-processed image.

For example, when the Demura device acquires an image, the image of each test point pattern often has a phenomenon of blurred boundary, and after low-pass filtering, the boundary of the test point pattern can be clear, such that the position of the image of each test point pattern in the preprocessed image can be accurately detected.

Specifically, an image boundary is a portion whose grayscale changes abruptly and discontinuously in a local image, and the number of pixels in a transition region is small. When the image is acquired, the image is easily influenced by factors such as an aberration, a field depth, defocusing of an imaging system or weak illumination, and an image of the boundary is degraded into a blurred boundary in this case. Positioning of the blurred boundary is inaccurate due to the existence of the image noise in the blurred boundary. The image noise usually belongs to a high-frequency component of the image, and the purpose of removing the image noise can be achieved with a low-pass filter. The low-pass filter may be a low-pass filter commonly used in the prior art, such as: arithmetic mean filter, geometric mean filter, harmonic mean filter, inverse harmonic mean filter, alpha mean filter, gaussian low pass filter, and the like.

In step S32, a binarization processing is performed on the low-pass filtered image to obtain a binary image, and the binary image includes a plurality of test spots which are in one-to-one correspondence with the plurality of test point patterns. The test spots are images formed by images of the test point patterns after undergoing low-pass filtering and binarization.

Figure 2A:
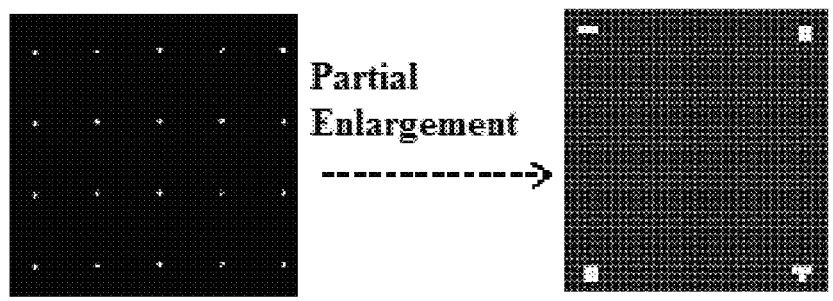
FIG. 2A is a schematic diagram illustrating a test spot in a binary image according to an embodiment of the present disclosure.

For example, FIG. 2A shows a schematic diagram illustrating a test spot in a binary image according to an embodiment of the present disclosure. The process of the binarization processing is as follows: comparing the grayscale of each pixel in the image with a preset threshold, if the grayscale of the pixel is greater than the preset threshold, adjusting the grayscale of the pixel to be 255, and if the grayscale of the pixel is not greater than the preset threshold, adjusting the grayscale of the pixel to be 0; for example, the preset threshold may be set according to actual requirements. In the case where the grayscale of each test point pattern is 220 and the grayscale of other positions is 31, the preset threshold may be set to 150.

The binarization processing may facilitate display and separation of the test spots. Meanwhile, the binarization processing may also improve a speed of image processing and reduce a calculation amount of the image processing.

In step S33, the image acquisition accuracy of the Demura device is determined according to the difference between the position of each of the plurality of test point patterns in the detection picture and the position of the corresponding test spot in the binary image.

Figure 3:
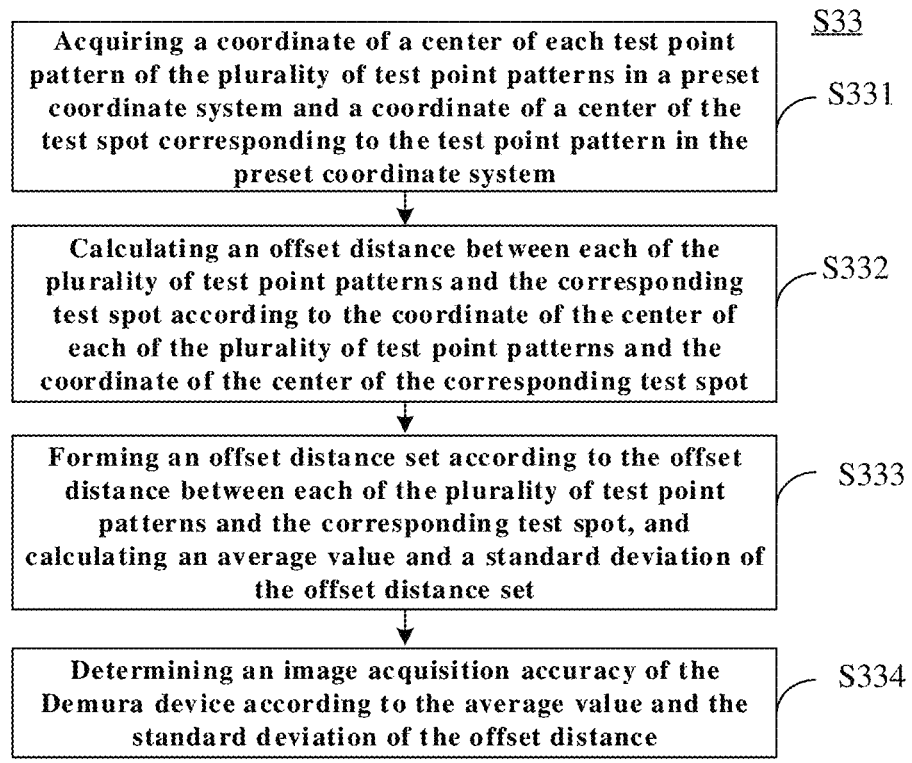
FIG. 3 is a schematic flowchart illustrating an alternative implementation of step S33 according to an embodiment of the present disclosure.

FIG. 3 is a flowchart illustrating an alternative implementation of step S33 according to an embodiment of the present disclosure. As shown in FIG. 3, step S33 may include steps S331 to S334 as follows.

In step S331, a coordinate of a center of each of the plurality of test point patterns in a preset coordinate system and a coordinate of a center of the test spot corresponding to the test point pattern in the preset coordinate system are obtained. Here, coverage ranges of the detection picture and the binary image in the preset coordinate system are the same.

Step S331 may be regarded as the steps of setting the two vertexes, which correspond to each other in position, of the detection picture and the binary image as the origin of the preset coordinate system, respectively, setting the row direction of each of the detection picture and the binary image as the horizontal axis direction of the preset coordinate system, and setting the column direction of each of the detection picture and the binary image as the vertical axis direction of the preset coordinate system. For example, each of the vertex at the lower left corner of the detection picture and the vertex at the lower left corner of the binary image is set as the origin of the preset coordinate system, the horizontal rightward direction of each of the detection picture and the binary image is set as the positive direction of a horizontal axis, and the vertical upward direction of each of the detection picture and the binary image is set as the positive direction of a vertical axis. In this way, and the preset coordinate system is established, and the coverage ranges of the detection picture and the binary image in the preset coordinate system are identical with each other. For example, the origin of the preset coordinate system may be the lower left corner of the left part of FIG. 3A, the horizontal axis may be along the bottom side of the left part of FIG. 3A, and the vertical axis may be along the left side of the left part of FIG. 3A.

It should be understood that the coordinate of the center of the test point pattern may be acquired from a driving signal when it drives the display panel to display the detection picture.

In addition, when each test point pattern is a pixel, the coordinate of the pixel may be regarded as the coordinate of the center of the test point pattern.

In step S332, an offset distance between each of the plurality of test point patterns and the corresponding test spot is calculated according to the coordinate of the center of the test point pattern and the coordinate of the center of the corresponding test spot.

Figure 3A:
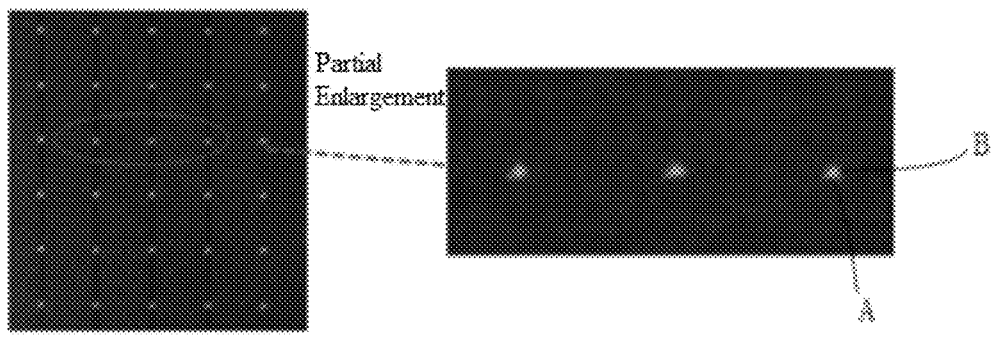
FIG. 3A is a schematic diagram illustrating a position offset (or position shift) between each of a plurality of test point patterns and a corresponding test spot according to an embodiment of the present disclosure.

For example, FIG. 3A is a schematic diagram illustrating a position offset between each of the plurality of test point patterns and its corresponding test spot according to an embodiment of the present disclosure. For convenience of distinction, a point A in FIG. 3A denotes a test point pattern, and a point B therein denotes a test spot. A position coordinate of each test point pattern A should theoretically coincide with a position coordinate of its corresponding test spot B, but the position and range of the coordinate of each test point pattern after being subjected to a preprocessing algorithm may be slight offset in a practical application, and a smaller position offset indicates a higher alignment accuracy. In other words, the smaller the position offset, the higher the image acquisition accuracy of the Demura device.

In some embodiments, the offset distance D between each test point pattern A and its corresponding test spot B is calculated according to the following formula:

$$D = \sqrt{(x^2 + y^2)}$$

Figure 3B:
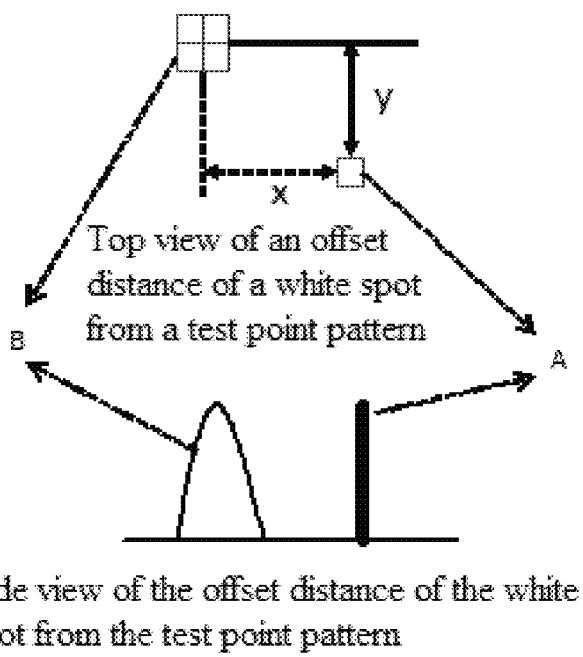
FIG. 3B is a schematic diagram illustrating an offset distance between a test point pattern and a corresponding test spot according to an embodiment of the present disclosure.

For example, x is a difference between an abscissa of the center of each test point pattern in the preset coordinate system and an abscissa of the center of the corresponding test spot in the preset coordinate system, y is a difference between an ordinate of the center of the test point pattern in the preset coordinate system and an ordinate of the center of the corresponding test spot in the preset coordinate system. FIG. 3B illustrates a top view of an offset distance between a test point pattern and its corresponding test spot and a side view, which corresponds to the top view, of the offset distance according to an embodiment of the present disclosure, where point A is the test point pattern and point B is the test spot.

In step S333, an offset distance set is formed according to the offset distance between each of the plurality of test point patterns and the corresponding test spot, and an average value and a standard deviation of the offset distance set are calculated.

It should be noted that, in the present disclosure, not only the average value of the distances between the plurality of test point patterns and their corresponding test spots, but also the standard deviation of the distances is taken into consideration. The standard deviation may measure the degree of dispersion of the distances between the plurality of test point patterns and the corresponding test spots relative to the average value. A large standard deviation represents a large difference between each of the most of the distances and the average value, and a small standard deviation represents a small difference between each of the most of the distances and the average value. The dispersion degree of the test spots can be more accurately reflected by calculating the average value of the distances and the standard deviation. In this way, the image acquisition accuracy of the Demura device can be more accurately evaluated.

For example, the offset distances between the plurality of test point patterns and the corresponding test spots, and the average value and the standard deviation of the offset distances may be calculated by using a conventional image processing tool such as MATLAB or C++, respectively.

In step S334, an image acquisition accuracy of the Demura device is determined according to the average value and the standard deviation of the offset distances.

For example, the image acquisition accuracy of the Demura device has a negative correlation with the average value and the standard deviation. That is, the larger the average value and the standard deviation are, the lower the image acquisition accuracy of the Demura device is, and the smaller the average value and the standard deviation are, the higher the image acquisition accuracy of the Demura device is. In some embodiments, a sum of a product of the average value and a first weight and a product of the standard deviation and a second weight may be calculated, and the image acquisition accuracy may be determined according to the sum. For example, the first weight may be a larger value and the second weight may be a smaller value, such as: the first weight is 0.9 and the second weight is 0.1. The image acquisition accuracy may be indicated by a numerical value, or may be indicated by a grade. For example, a value negatively correlated with the sum is calculated according to a preset formula as the image acquisition accuracy. For example, the sum of the first weight and the second weight is equal to 1.

In practical applications, when comparing the image acquisition accuracies of two Demura devices, the display panel is controlled to display a detection picture, and preprocessed images are respectively acquired by the two Demura devices. An average value and a standard deviation of offset distances between a plurality of test spots and their corresponding test point patterns are calculated according to the steps S331 to S333 for each of the Demura devices. The image acquisition accuracies of the two Demura devices can be compared by directly comparing the two average values with each other and comparing the two standard deviations with each other. For example, it can be determined that the Demura device with a smaller average value of the offset distances has a higher image acquisition accuracy. Under the condition that the average values of the offset distances of the two Demura devices are the same, the Demura device with a smaller standard deviation of the offset distances has a higher image acquisition accuracy.

Figure 4:
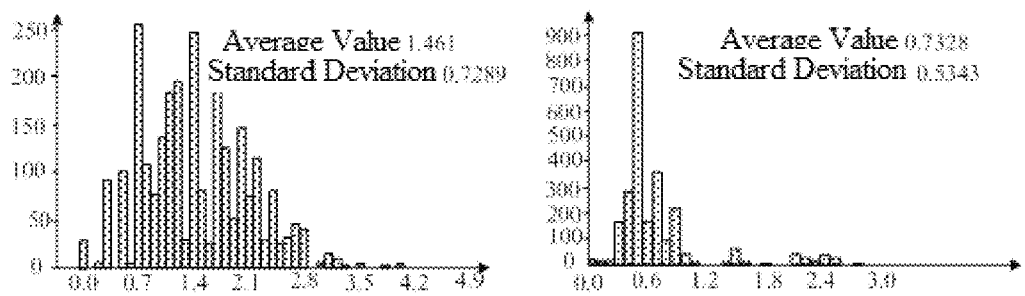
FIG. 4 is a schematic diagram illustrating distance histograms corresponding to two Demura devices.

FIG. 4 shows histograms of offset distances for two Demura devices. For example, the left histogram in FIG. 4 is a histogram of offset distances between a plurality of test point patterns and their corresponding test spots according to an image acquired by a Demura device provided by manufacturer A, the right histogram is a histogram of offset distances between a plurality of test point patterns and their corresponding test spots according to an image acquired by a Demura device provided by manufacturer B. The total number of test points N in each histogram is 2616. In the two histograms, the horizontal axis represents the offset distance, and the vertical axis represents the number of test point patterns. An average value of the offset distances corresponding to the image acquired by the Demura device provided by manufacturer A is calculated to be 1.461 in the left histogram, and a standard deviation of the offset distances is 0.7289 in the left histogram; an average value of the offset distances corresponding to the image acquired by Demura device provided by manufacturer B is calculated to be 0.7328 in the right histogram, and a standard deviation of the offset distances is 0.5343 in the right histogram. Therefore, the image acquisition accuracy and the technical capability of the Demura device provided by manufacturer B are determined to be higher than those of the Demura device provided by manufacturer A.

Figure 5:
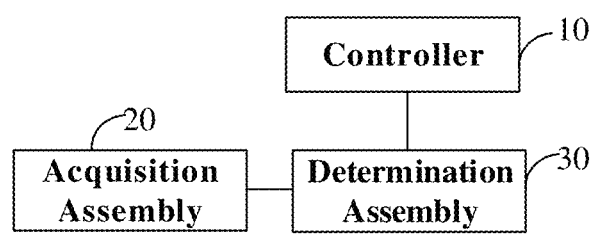
FIG. 5 is a schematic diagram illustrating a structure of an apparatus for evaluating an image acquisition accuracy of a Demura device according to an embodiment of the present disclosure.

FIG. 5 is a schematic diagram showing a structure of an apparatus for evaluating an image acquisition accuracy of a Demura device according to an embodiment of the present disclosure, and the apparatus can implement the method for evaluating an image acquisition accuracy of a Demura device as described above. As shown in FIG. 5, the apparatus includes: a controller 10, an acquisition assembly 20, and a determination assembly 30.

For example, the controller 10 is configured to control a display panel to display a detection picture, and the detection picture includes a plurality of test point patterns with an interval therebetween. Alternatively, the intervals between every two adjacent test point patterns of the plurality of test point patterns in the detection picture may be equal to each other.

The acquisition assembly 20 is configured to acquire a preprocessed image corresponding to the detection image, and the preprocessed image and its corresponding detection picture have a same size and a same shape. For example, acquisition assembly 20 may be a Demura device. In other words, the preprocessed image may be acquired by the Demura device that may acquire an image of the detection picture.

The determination assembly 30 is configured to determine the image acquisition accuracy of the Demura device according to a difference between a position of each of the plurality of test point patterns in the detection picture and a position of a corresponding test spot in the preprocessed image.

In some embodiments, the grayscale of each of the test points is between 95 and 255, and the grayscale of other positions in the detection picture is between 0 and 50. For example, the grayscale of each of the test points is 225 and the grayscale of the other positions is 31.

Figure 6:
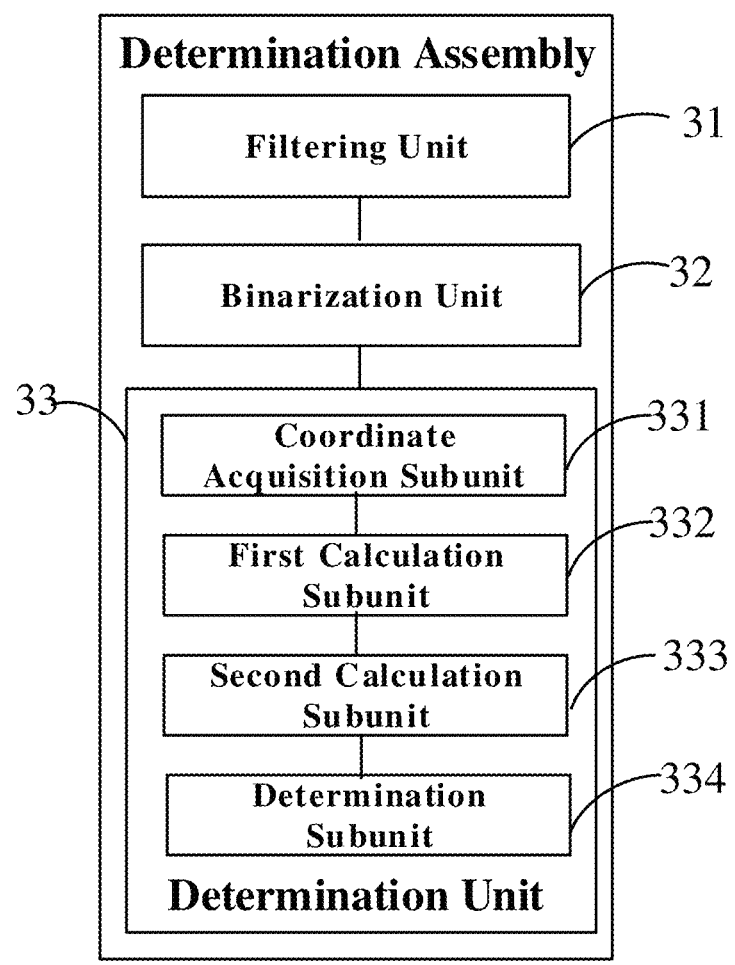
FIG. 6 is a schematic diagram illustrating an alternative structure of a determination assembly in an embodiment of the present disclosure.

FIG. 6 is a schematic diagram showing an alternative structure of the determination assembly 30 according to an embodiment of the present disclosure. As shown in FIG. 6, the determination assembly 30 may include: a filtering unit 31, a binarization unit 32, and a determination unit 33.

For example, the filtering unit 31 may perform low-pass filtering on the preprocessed image.

The binarization unit 32 may perform a binarization processing on the low-pass filtered image to obtain a binary image, and the binary image includes a plurality of test spots which are in one-to-one correspondence with the plurality of test point patterns.

The determination unit 33 may determine the image acquisition accuracy of the Demura device according to a difference between a position of each of the plurality of test point patterns in the detection picture and a position of a corresponding test spot in the binary image.

In some embodiments, the determination unit 33 may include, for example: a coordinate acquisition subunit 331, a first calculation subunit 332, a second calculation subunit 333, and a determination subunit 334.

For example, the coordinate acquisition subunit 331 may acquire a coordinate of a center of each of the plurality of test point patterns in a preset coordinate system and a coordinate of a center of a test spot corresponding to each of the test point patterns in the preset coordinate system. For example, the coverage ranges of the detection picture and the binary image in the preset coordinate system are the same.

The first calculation subunit 332 may calculate an offset distance between each of the plurality of test point patterns and the corresponding test spot according to the coordinate of the center of each of the plurality of test point patterns and the coordinate of the center of the corresponding test spot.

In some embodiments, the first calculation subunit 332 may calculate an offset distance D between each of the plurality of test spot patterns and the corresponding test spot, for example, according to the following formula:

$$D=\sqrt{(x^2+y^2)}$$

where x is the difference between an abscissa of the center of each test point pattern in the preset coordinate system and the abscissa of the center of the corresponding test spot (i.e., the test spot corresponding to the test point pattern) in the preset coordinate system; y is the difference between an ordinate of the center of the test point pattern in the preset coordinate system and an ordinate of the center of the corresponding test spot in the preset coordinate system.

The second calculation subunit 333 may form an offset distance set according to the offset distances between the plurality of test point patterns and their corresponding test spots, and calculate an average value and a standard deviation of the offset distance set.

The determination subunit 33 may determine the image acquisition accuracy of the Demura device according to the average value and the standard deviation of the offset distance set.

In addition, for the description of the implementation details and the technical effects of the above assemblies, units and subunits, reference may be made to the description of the foregoing method embodiments, and details are not described here again.

Further, the apparatus shown in FIG. 5 may further include a memory, which may be connected to the controller 10, for example, for storing the coordinates of the test spot patterns, the coordinates of the test spots, the offset distances, the average value, the standard deviation, and other relevant data and computer programs.

It should be understood that the various components of the apparatus shown in each of FIGS. 5 and 6 may be implemented by hardware, or by a combination of hardware and software. For example, each component of the apparatus shown in each of FIGS. 5 and 6 may be a Central Processing Unit (CPU), an Application Processor (AP), a Digital Signal Processor (DSP), a field programmable logic circuit (FPGA), a Microprocessor (MCU), a filter, an Integrated Circuit (IC), or an Application Specific Integrated Circuit (ASIC) having the respective functions described in the embodiments of the present disclosure. For example, the respective components of the apparatuses shown in FIGS. 5 and 6 may be implemented by a combination of a processor, a memory, and a computer program stored in the memory, the processor reading and executing the computer program from the memory to function as the respective components of the apparatus shown in each of FIGS. 5 and 6.

An embodiment of the present disclosure further provides an electronic device, which includes one or more processors and a storage device. For example, the storage device has one or more programs stored thereon, which when executed by the one or more processors, cause the one or more processors to implement the method for evaluating an image acquisition accuracy of a Demura device as described in the foregoing embodiments.

An embodiment of the present disclosure further provides a non-transitory computer readable storage medium on which a computer program is stored, and for example, the computer program when executed implements the method for evaluating image acquisition accuracy of a Demura device as described in the foregoing embodiments.

The method for evaluating the image acquisition accuracy of the Demura device, the apparatus for evaluating the image acquisition accuracy of the Demura device, the electronic device, and the non-transitory computer readable storage medium provided by the embodiments of the present disclosure can objectively and accurately evaluate the image acquisition accuracy of the Demura device, thereby being beneficial to improving the Demura compensation effect.

It should be noted that the above-described embodiments of the present disclosure may be combined with each other in a case of no explicit conflict.

It should be understood that the above embodiments are merely exemplary embodiments adopted to illustrate the principles of the present disclosure, and the present disclosure is not limited thereto. It will be apparent to one of ordinary skill in the art that various changes and modifications may be made without departing from the scope of the present disclosure as defined in the appended claims, and such changes and modifications also fall within the scope of the present disclosure.

What is claimed is:

1. A method for evaluating an image acquisition accuracy of a Demura device, comprising:
controlling a display panel to display a detection picture, wherein the detection picture comprises a plurality of test point patterns with an interval therebetween;
acquiring an image of the detection picture by the Demura device to obtain a preprocessed image corresponding to the detection picture, wherein the preprocessed image and a corresponding detection picture have a same size and a same shape; and determining the image acquisition accuracy of the Demura device according to a difference between a position of each test point pattern of the plurality of test point patterns in the detection picture and a corresponding position of the test point pattern in the preprocessed image.

2. The method of claim 1, wherein the determining the image acquisition accuracy of the Demura device according to a difference between a position of each test point pattern of the plurality of test point patterns in the detection picture and a corresponding position of the test point pattern in the preprocessed image comprises:

performing low-pass filtering on the preprocessed image;

performing a binarization processing on a low-pass filtered image to obtain a binary image, wherein the binary image comprises a plurality of test spots in one-to-one correspondence with the plurality of test point patterns; and determining the image acquisition accuracy of the Demura device according to a difference between the position of each of the plurality of test point patterns in the detection picture and a position of a corresponding test spot in the binary image.

3. The method of claim 2, wherein the determining the image acquisition accuracy of the Demura device according to a difference between the position of each of the plurality of test point patterns in the detection picture and a position of a corresponding test spot in the binary image comprises:

acquiring a coordinate of a center of each test point pattern of the plurality of test point patterns in a preset coordinate system and a coordinate of a center of a test spot corresponding to the test point pattern in the preset coordinate system, wherein a coverage range of the detection picture in the preset coordinate system and a coverage range of the binary image in the preset coordinate system are identical with each other;

calculating an offset distance between each of the plurality of test point patterns and the corresponding test spot according to the coordinate of the center of each of the plurality of test point patterns and the coordinate of the center of the corresponding test spot;

forming an offset distance set according to the offset distance between each of the plurality of test point patterns and the corresponding test spot, and calculating an average value and a standard deviation of the offset distance set; and determining the image acquisition accuracy of the Demura device according to the average value and the standard deviation of the offset distance set.

4. The method of claim 3, wherein an offset distance D between each test point pattern of the plurality of test point patterns and the corresponding test spot is calculated according to the following formula:

$$D=\sqrt{(x^2+y^2)}$$

where x is a difference between an abscissa of the center of the test point pattern in the preset coordinate system and an abscissa of the center of the corresponding test spot in the preset coordinate system; and y is a difference between an ordinate of the center of the test point pattern in the preset coordinate system and an ordinate of the center of the corresponding test spot in the preset coordinate system.

5. The method of claim 1, wherein a grayscale of each of the plurality of test point patterns is between 95 and 255, and a grayscale of other positions except the plurality of test point patterns in the detection picture is between 0 and 50.

6. The method of claim 5, wherein the grayscale of each of the plurality of test point patterns is 225, and the grayscale of the other positions except the plurality of test point patterns in the detection picture is 31.

7. The method of claim 1, wherein each of the plurality of test point patterns is a single pixel.

8. The method of claim 1, wherein the plurality of test point patterns are uniformly arranged in an array.

9. The method of claim 1, wherein every two adjacent test point patterns of the plurality of test point patterns in the detection picture are arranged with a same interval therebetween.

10. An apparatus for evaluating an image acquisition accuracy of a Demura device, comprising:

a controller configured to control a display panel to display a detection picture, wherein the detection picture comprises a plurality of test point patterns with an interval therebetween;

an acquisition assembly configured to acquire a preprocessed image corresponding to the detection picture, wherein the preprocessed image and a corresponding detection picture have a same size and a same shape; and a determination assembly configured to determine the image acquisition accuracy of the Demura device according to a difference between a position of each test point pattern of the plurality of test point patterns in the detection picture and a corresponding position of test point pattern in the preprocessed image.

11. The apparatus of claim 10, wherein the determination assembly comprises:

a filtering unit configured to perform low-pass filtering on the preprocessed image;

a binarization unit configured to perform a binarization processing on a low-pass filtered image to obtain a binary image, wherein the binary image comprises a plurality of test spots in one-to-one correspondence with the plurality of test point patterns; and a determination unit configured to determine the image acquisition accuracy of the Demura device according to a difference between the position of each of the plurality of test point patterns in the detection picture and a position of a corresponding test spot in the binary image.

12. The apparatus of claim 11, wherein the determination unit comprises:

a coordinate acquisition subunit configured to acquire a coordinate of a center of each test point pattern of the plurality of test point patterns in a preset coordinate system and a coordinate of a center of the test spot corresponding to the test point pattern in the preset coordinate system, wherein a coverage range of the detection picture in the preset coordinate system and a coverage range of the binary image in the preset coordinate system are identical with each other;

a first calculation subunit configured to calculate an offset distance between each of the plurality of test point patterns and the corresponding test spot according to the coordinate of the center of each of the plurality of test point patterns and the coordinate of the center of the corresponding test spot;

a second calculation subunit configured to form an offset distance set according to the offset distance between each of the plurality of test point patterns and the corresponding test spot, and calculate an average value and a standard deviation of the offset distance set; and a determination subunit configured to determine the image acquisition accuracy of the Demura device according to the average value and the standard deviation of the offset distance set.

13. The apparatus of claim 12, wherein the first calculation subunit is configured to calculate an offset distance D between each test point pattern of the plurality of test spot patterns and the corresponding test spot according to the following formula:

$$D=\sqrt{(x^2+y^2)}$$

where x is a difference between an abscissa of the center of the test point pattern in the preset coordinate system and an abscissa of the center of the corresponding test spot in the preset coordinate system; and y is a difference between an ordinate of the center of the test point pattern in the preset coordinate system and an ordinate of the center of the corresponding test spot in the preset coordinate system.

14. The apparatus of claim 10, wherein a grayscale of each of the plurality of test point patterns is between 95 and 255, and a grayscale of other positions except the plurality of test point patterns in the detection picture is between 0 and 50.

15. The apparatus of claim 14, wherein the grayscale of each of the plurality of test point patterns is 225, and the grayscale of the other positions except the plurality of test point patterns in the detection picture is 31.

16. The apparatus of claim 10, wherein each of the plurality of test point patterns is a single pixel.

17. The apparatus of claim 10, wherein the plurality of test point patterns are uniformly arranged in an array.

18. The apparatus of claim 10, wherein every two adjacent test point patterns of the plurality of test point patterns in the detection picture are arranged with a same interval therebetween.

19. An electronic device, comprising:
one or more processors;
a storage device having one or more programs stored thereon, which when executed by the one or more processors, cause the one or more processors to implement the method of claim 1.

20. A non-transitory computer-readable storage medium, comprising a computer program stored thereon, wherein the computer program, when executed by a processor, implements the method of claim 1.

* * * * *